United States Patent
Watanabe et al.

(10) Patent No.: US 8,249,147 B2
(45) Date of Patent: Aug. 21, 2012

(54) IMAGE DECODING DEVICE, IMAGE DECODING METHOD, AND IMAGE DECODING PROGRAM

(75) Inventors: Shinji Watanabe, Tokyo (JP); Nobuaki Izumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1397 days.

(21) Appl. No.: 10/545,678

(22) PCT Filed: Nov. 30, 2004

(86) PCT No.: PCT/JP2004/017804
§ 371 (c)(1),
(2), (4) Date: May 9, 2006

(87) PCT Pub. No.: WO2005/062622
PCT Pub. Date: Jul. 7, 2005

(65) Prior Publication Data
US 2006/0291556 A1 Dec. 28, 2006

(30) Foreign Application Priority Data
Dec. 15, 2003 (JP) .............................. P2003-417336

(51) Int. Cl.
*H04N 7/12* (2006.01)
(52) U.S. Cl. .......... 375/240.03; 375/240.18; 375/240.24
(58) Field of Classification Search ............... 375/240.03
See application file for complete search history.

(56) References Cited

U.S. PATENT DOCUMENTS

| 5,875,266 A | 2/1999 | Fukuda et al. | |
| 6,360,016 B1 * | 3/2002 | Shen et al. | 382/238 |
| 2004/0223550 A1 * | 11/2004 | Hagiwara | 375/240.25 |

FOREIGN PATENT DOCUMENTS

| JP | 04-220081 | | 8/1992 |
| JP | 6-292018 | | 10/1994 |
| JP | 11-41601 | | 2/1999 |
| JP | 11-96138 | | 4/1999 |
| JP | 11-096138 | * | 9/1999 |
| JP | 11 096138 | * | 9/1999 |

OTHER PUBLICATIONS

Communication pursuant to Article 94(3) EPC from the European Patent Office regarding application 04 820 650.2-2223, dated Nov. 29, 2011.
Office Action dated Apr. 4, 2012, in corresponding European Patent Application No. 04 820 650 2-2223, 5 pages.

* cited by examiner

*Primary Examiner* — Jay Au Patel
*Assistant Examiner* — Jessica Prince
(74) *Attorney, Agent, or Firm* — Finnegan, Henderson, Farabow, Garrett & Dunner, L.L.P.

(57) ABSTRACT

The present invention is directed to an image decoding apparatus adapted for decoding information obtained by implementing inverse quantization and inverse orthogonal transform to image compressed information in which an input image signal is blocked to implement orthogonal transform thereto on the block basis so that quantization is performed with respect thereto, which comprises a reversible decoder (12) for decoding quantized and encoded transform coefficients, an inverse quantizer (13) indicating, as a flag, in inverse-quantizing transform coefficients which have been decoded by the reversible decoder (12), existence of each transform coefficient every processing block of inverse quantization, and an inverse transform element (14) for changing inverse transform processing to be implemented to inverse quantization transform coefficients within processing block by using the flag which has been indicated by the inverse-quantizer (13).

10 Claims, 7 Drawing Sheets

$$\begin{pmatrix} 1 & 1 & 1 & 1 \\ 1 & 1 & -1 & -1 \\ 1 & -1 & -1 & 1 \\ 1 & -1 & 1 & -1 \end{pmatrix} \begin{pmatrix} 1 & 1 & 1 & 1/2 \\ 1 & 1/2 & -1 & -1 \\ 1 & -1/2 & -1 & 1 \\ 1 & -1 & 1 & -1/2 \end{pmatrix} \begin{pmatrix} 1 & 1 \\ 1 & -1 \end{pmatrix} \quad \cdots (1)$$

FIG. 8A

| a | | | |
|---|---|---|---|
| | | | |
| | | | |
| | | | |

| a | a | a | a |
|---|---|---|---|
| a | a | a | a |
| a | a | a | a |
| a | a | a | a |

| a | b | c | d |
|---|---|---|---|
| | | | |
| | | | |
| | | | |

| a' | b' | c' | d' |
|----|----|----|----|
| a' | b' | c' | d' |
| a' | b' | c' | d' |
| a' | b' | c' | d' |

| a | | | |
|---|---|---|---|
| b | | | |
| c | | | |
| d | | | |

| a' | a' | a' | a' |
|----|----|----|----|
| b' | b' | b' | b' |
| c' | c' | c' | c' |
| d' | d' | d' | d' |

☐ = 0

IMAGE DECODING DEVICE, IMAGE DECODING METHOD, AND IMAGE DECODING PROGRAM

TECHNICAL FIELD

The present invention relates to an image decoding apparatus, an image decoding method and an image decoding program, and more particularly to an image decoding apparatus, an image decoding method and an image decoding program which are used in receiving, through network media such as satellite broadcasting service, cable TV (television) or Internet, etc., or in processing, on storage or memory media such as optical disc, magnetic disc or flash memory, etc., image compressed information (bit stream) compressed by orthogonal transform such as Discrete Cosine Transform or Karhunen-Loeve Transform, etc., and motion prediction/compression like MPEG (Moving Picture Experts Group), H.26x, etc.

This Application claims priority of Japanese Patent Application No. 2003-417336, filed on Dec. 15, 2003, the entirety of which is incorporated by reference herein.

BACKGROUND ART

Hitherto, apparatuses in conformity with the system such as MPEG, etc. in which image information are handled as digital data to compress such image information by orthogonal transform such as Discrete Cosine Transform, etc. and motion prediction/compensation by utilizing redundancy specific to the image information with a view to performing efficient transmission/storage of information in this instance have been used in both information distribution (delivery) at broadcasting station, etc., and information reception in general homes.

Particularly, MPEG2 (ISO/IEC 13818-2) is defined as general purpose image encoding system, and is widely used at present for broad application of professional use purpose and consumer use purpose with the standard for covering both interlaced scanning image and sequential scanning image, and standard resolution image and high definition image. By using the MPEG2 compression system, e.g., in the case of interlaced scanning image of the standard resolution having 720 ×480 pixels, code quantity (bit rate) of 4 to 8 Mbps is allocated, and in the case of interlaced scanning image of the high resolution having 1920 ×1088 pixels, code quantity (bit rate) of 18 to 22 Mbps is allocated so that realization of high compression factor and satisfactory picture quality can be made.

The MPEG2 was mainly directed to high picture quality encoding adapted to broadcasting use purpose, but did not comply with the encoding system having code quantity (bit rate) lower than that of the MPEG1, i.e., higher compression factor. However, it is expected that need of such encoding system will be increased in future with popularization of portable (mobile) terminals, and standardization of MPEG4 encoding system was performed in correspondence therewith. In regard to the image encoding system, its standard was approved as the International Standard as ISO/IEC 14496-2 on December, 1998.

Further, in recent years, standardization of H.264 (ITU-TQ6/16 VCEG) is being developed with image encoding for television conference being as the initial or original object. It is known that while the H.264 is required to have a larger number of operation quantities with respect to encoding/decoding thereof as compared to the conventional encoding system such as MPEG2 or MPEG4, higher encoding efficiency can be realized. Moreover, at present, as a part of activity of the MPEG4, standardization in which functions which cannot be supported by the H.264 are also taken in with the H.264 being as base to realize higher encoding efficiency is being performed by JVT (Joint Video Team).

An image information encoding apparatus of a practical example of the encoding system in which standardization is performed by the JVT (hereinafter referred to as JVT Codec or H.264|MPEG-4 AVC) will be explained. FIG. 1 is a block diagram of the image information encoding apparatus adapted for realizing image compression by orthogonal transform such as Discrete Cosine Transform or Karhunen-Loeve Transform, etc. and motion compensation. As shown in FIG. 1, the image information encoding apparatus 100 comprises an A/D (Analogue/Digital) converter 101, an image sorting buffer 102, an adder 103, an orthogonal transform element 104, a quantizer 105, a reversible encoder 106, a storage buffer 107, an inverse-quantizer 108, an inverse-orthogonal transform element 109, a deblocking filter 110, a frame memory 111, a motion prediction/compensation element 112, an intra predictor 113, and a rate controller 114.

In FIG. 1, the A/D converter 101 converts an inputted image signal into a digital signal. The image sorting buffer 102 performs sorting operation of frames in accordance with GOP (Group of Pictures) structure of image compressed information outputted from the image information encoding apparatus 100. Here, in regard to image in which intra (intra-image) encoding is performed, the image sorting buffer 102 delivers image information of the entirety of frame to the orthogonal transform element 104. The orthogonal transform element 104 implements orthogonal transform such as Discrete Cosine Transform or Karhunen-Loeve Transform, etc. to the image information to deliver transform coefficients to the quantizer 105. The quantizer 105 implements quantization processing to the transform coefficients delivered from the orthogonal transform element 104.

The reversible encoder 106 implements reversible encoding such as variable length encoding or arithmetic encoding, etc. to the quantized transform coefficients to deliver the transform coefficients thus encoded to the storage buffer 107 to allow the storage buffer 107 to store those encoded transform coefficients. The encoded transform coefficients are outputted as image compressed information.

The behavior (operation) of the quantizer 105 is controlled by the rate controller 114. Moreover, the quantizer 105 delivers quantized transform coefficients to the inverse-quantizer 108. The inverse-quantizer 108 inverse-quantizes the transform coefficients. The inverse-orthoginal transform element 109 implements inverse orthogonal transform processing to the inverse-quantized transform coefficients to generate decoded image information. The deblocking filter 110 serves to remove block distortion from the decoded image information to deliver the decoded image information thus processed to the frame memory 111 to allow the frame memory 111 to store such decoded image information.

On the other hand, in regard to image in which inter (iner-image) encoding is performed, the image sorting buffer 102 delivers image information to a motion prediction/compensation element 112. The motion prediction/compensation element 112 takes out, from the frame memory 111, image information which is referred at the same time to implement motion prediction/compensation processing thereto to generate reference image information. The motion prediction/compensation element 112 delivers the reference image information to the adder 103. The adder 103 converts the refrence image information into difference signal between the reference image information and corresponding image information. Moreover, the motion compensation/prediction element 112 delivers, at the same time, motion vector information to the reversible encoder 106.

The reversible encoder 106 implements reversible encoding processing such as variable length encoding or arithmetic encoding, etc. to the motion vector information to form information which is inserted into header portion of image compressed information. It is to be noted that since other processing are similar to those of image compreseed information to which intra-encoding is implemented, the explanation thereof will be omitted.

Here, in the encoding system in which standardization is performed by the above-described JVT (hereinafter referred to as JVT Codec), there is employed the intra predictive encoding system of generating prediction image from pixels around block in performing intra encoding processing to encode difference between corresponding image and the prediction image. Namely, in regard to image in which intra-encoding is performed, prediction image is generated from pixel value in which encoding processing has been already completed, which is in the vicinity of pixel block to be encoded, so that difference with respect to the prediction image is encoded. The inverse-quantizer 108 and the inverse-orthogonal transform element 109 respectively inverse-quantize and inverse-orthogonally transform intra-encoded pixels. The adder 103 adds output of the inverse-orthogonal transform element 109 and prediction image used when corresponding pixel block is encoded to deliver the added value thereof to the frame memory 111 to allow the frame memory 111 to store the added value thus obtained. In the case of pixel block to be intra-encoded, an intra predictor 113 reads out neighboring pixels stored in the frame memory 111 in which encoding processing has been already completed to generate prediction image. At this time, also with respect to the intra prediction mode used for generation of prediction image, at the reversible encoder 106, reversible encoding processing is implemented thereto to output the prediction image thus obtained in the state included in image compressed information.

Subsequently, outline of the configuration of an image information decoding apparatus corresponding to the above-described image information encoding apparatus 100 is shown in FIG. 2. The image information decoding apparatus 120 comprises, as shown in FIG. 2, a storage buffer 121, a reversible decoder 122, an inverse-quantizer 123, an inverse-orthogonal transform element 124, an adder 125, an image sorting buffer 126, a D/A (Digital/Analogue) converter 127, a motion prediction/compensation element 128, a frame memory 129, and an intra-predictor 130.

In FIG. 2, the storage buffer 121 temporarily stores inputted image compressed information thereafter to transfer that image compressed information to the reversible decoder 122. The reversible decoder 122 implements processing such as variable length decoding or arithmetic decoding, etc. to the image compressed information on the basis of the determined format for image compressed information to deliver quantized transform coefficients to the inverse-quantizer 123. Moreover, in the case where corresponding frame is inter-encoded frame, the reversible decoder 122 also decodes motion vector information stored in the header portion of image compressed information to deliver the decoded motion vector information thus obtained to the motion prediction/compensation element 128.

The inverse-quantizer 123 inverse-quantizes the quantized transform coefficients which have been delivered from the reversible decoder 122 to deliver the transform coefficients thus processed to the inverse-orthogonal transform element 124. The inverse-orthogonal transform element 124 implements inverse-orthogonal transform such as Inverse Discrete Cosine Transform or Inverse Karhunen-Loeve Transform, etc. to the transform coefficients on the basis of the determined format for image compressed information.

Here, in the case where corresponding frame is intra-encoded frame, image information to which inverse-orthogonal transform processing has been implemented is stored into the image sorting buffer 126. After undergone D/A transform processing at the D/A converter 127, the image information thus processed is outputted.

On the other hand, in the case where corresponding frame is inter-encoded frame, the motion prediction/compensation element 128 generates reference image on the basis of motion vector information to which reversible decoding has been implemented and image information stored in the frame memory 129 to deliver the reference image thus generated to the adder 125. The adder 125 synthesizes the reference image and an output of the inverse-orthogonal transform element 124. It is to be noted that since other processing are similar to those of intra-encoded frame, the explanation thereof will be omitted.

Since the intra-predictive encoding system is employed in the JVT Codec in this example, in the case where corresponding frame is intra-encoded frame, the intra predictor 130 reads out image from the frame memory 129 to generate prediction image in accordance with the intra prediction mode to which reversible decoding processing has been implemented at the reversible decoder 122. The adder 125 adds an output of the inverse-orthogonal transform element 124 and the prediction image.

The image information encoding apparatus 100 and the image information decoding apparatus 120 which have been explained above are described in the Japanese Patent Application Laid Open No. 2001-199818 publication, and the Japanese Patent Application Laid Open No. 2002-20953 publication.

Meanwhile, at the inverse-orthogonal transform element 124 shown in FIG. 2, matrix calculations of 8×8/4×4 of two times are performed in length and breadth directions, e.g., in units of block of 8×8/4×4 pixels with respect to transform coefficients to implement inverse orthogonal processing. However, at the decoding processing, in order to perform inverse-transform processing of all blocks in which an image is divided into 8×8/4×4 pixels, calculation quantity would become vast (large). Since there is no change of value also after matrix processing (transformed values are all zero) with respect to block in which any coefficient does not exist (pixel values are all zero), wasteful calculation would be performed. In addition, also in the case where only DC component of block exists, or deviation of coefficients exists within block, there are instances where efficiency is not good for the purpose of performing two times of matrix calculations of 8×8/4×4.

DISCLOSURE OF THE INVENTION

Problems to be Solved by the Invention

An object of the present invention is to provide a novel image decoding apparatus, a novel image decoding method and a novel image decoding program which can eliminate or solve problems that prior arts as described above have.

Another object of the present invention is to provide an image decoding apparatus, an image decoding method and an image decoding program which are adapted for performing realization of improvement in efficiency of inverse-transform processing by inverse-transform means and reduction in calculation cost to have ability to attain realization of high speed decoding processing.

The image decoding apparatus according to the present invention is directed to an image decoding apparatus adapted for decoding information obtained by implementing inverse quantization and inverse orthogonal transform to image compressed information in which an input image signal is blocked to implement orthogonal transform thereto on the block basis so that quantization is performed with respect thereto, which comprises: a decoder for decoding quantized and encoded transform coefficients; an inverse-quantizer for indicating, as a flag, in inverse-quantizing transform coefficients which have been decoded by the decoder, existence of each transform coefficient every processing block of inverse quantization; and an inverse transform element for changing inverse transform processing to be implemented to inverse-quantization transform coefficients within processing block by using the flag which has been indicated by the inverse-quantizer.

Since the inverse transform element serves to change inverse transform processing to be implemented to inverse quantization transform coefficients within processing block by using the flag which has been indicated by the inverse quantization means, it becomes unnecessary to perform matrix calculations in length and breadth directions at all blocks.

The image decoding method according to the present invention is directed to an image decoding method of decoding information obtained by implementing inverse quantization and inverse orthogonal transform to image compressed information in which an input image signal is blocked to implement orthogonal transform thereto on the block basis so that quantization is performed with respect thereto, the image decoding method comprising: a decoding step of decoding quantized and encoded transform coefficients; an inverse quantization step of indicating, as a flag, in inverse-quantizing transform coefficients which have been decoded by the decoding step, existence of each transform coefficient every processing block of inverse-quantization; and an inverse transform step of changing inverse transform processing to be implemented to inverse quantization transform coefficients within processing block by using the flag which has been indicated by the inverse quantization step.

Since the inverse transform step serves to change inverse transform processing to be implemented to inverse quantization transform coefficients within processing block by using the flag which has been indicated by the inverse quantization step, it becomes unnecessary to perform matrix calculations in length and breadth directions at all blocks.

The image decoding program according to the present invention is directed to an image decoding program for executing an image decoding method of decoding information obtained by implementing inverse quantization and inverse orthogonal transform to image compressed information in which an input image signal is blocked to implement orthogonal transform thereto on the block basis so that quantization is performed with respect thereto, the image decoding method comprising: a decoding step of decoding quantized and encoded transform coefficients; an inverse-quantization step of indicating, as a flag, in inverse-quantizing the transform coefficients which have been decoded by the decoding step, existence of each transform coefficient every processing block of inverse quantization; and an inverse transform step of changing inverse transform processing to be implemented to inverse quantization transform coefficients within processing block by using the flag which has been indicated by the inverse quantization step.

Since the inverse transform step serves to change inverse transform processing to be implemented to inverse quantization transform coefficients within processing block by using the flag which has been indicated by the inverse quantization step, it becomes unnecessary to perform matrix calculations in length and breadth directions at all blocks.

In the image decoding apparatus according to the present invention, when inverse quantization means inverse-quantizes transform coefficients which have been decoded by the decoding means, existence of each transform coefficient is indicated as a flag every processing block of inverse quantization, and the inverse transform element serves to change inverse transform processing to be implemented to inverse quantization transform coefficients within processing block by using the flag which has been indicated by the inverse quantization means. Accordingly, it becomes unnecessary to perform matrix calculations in length and breadth directions at all blocks. Thus, high speed decoding processing can be realized.

In the image decoding method according to the present invention, since existence of each transform coefficient is indicated as a flag every processing block of inverse quantization when inverse-quantization step serves to inverse-quantize transform coefficients which have been decoded by the decoding step, and the inverse transform step serves to change inverse transform processing to be implemented to inverse quantization transform coefficients within processing block by using the flag which has been indicated by the inverse quantization step, it becomes unnecessary to perform matrix calculations in length and breadth directions at all blocks. Thus, high speed decoding processing can be made.

In the image decoding program according to the present invention, since when the inverse quantization step serves to inverse-quantize transform coefficients which have been decoded by the decoding step, existence of each transform coefficient is indicated as a flag every processing block of inverse-quantization, and the inverse transform step serves to change inverse transform processing to be implemented to inverse quantization transform coefficients within processing block by using the flag which has been indicated by the inverse quantization step, it becomes unnecessary to perform matrix calculations in length and breadth directions at all blocks. Thus, high speed decoding processing can be realized.

Still further objects of the present invention and more practical merits obtained by the present invention will become more apprarent from the description of the embodiments which will be given below with reference to the attached drawings.

BRIEF DESCRIPTION OF THE DRAWINGS

FIGS. 8A to 8C are views used for explanation of steps S12 to S14 shown in FIG. 5.

BEAST MODE FOR CARRYING OUT THE INVENTION

Several preferred embodiments for carrying out the present invention will now be described.

Figure 3:
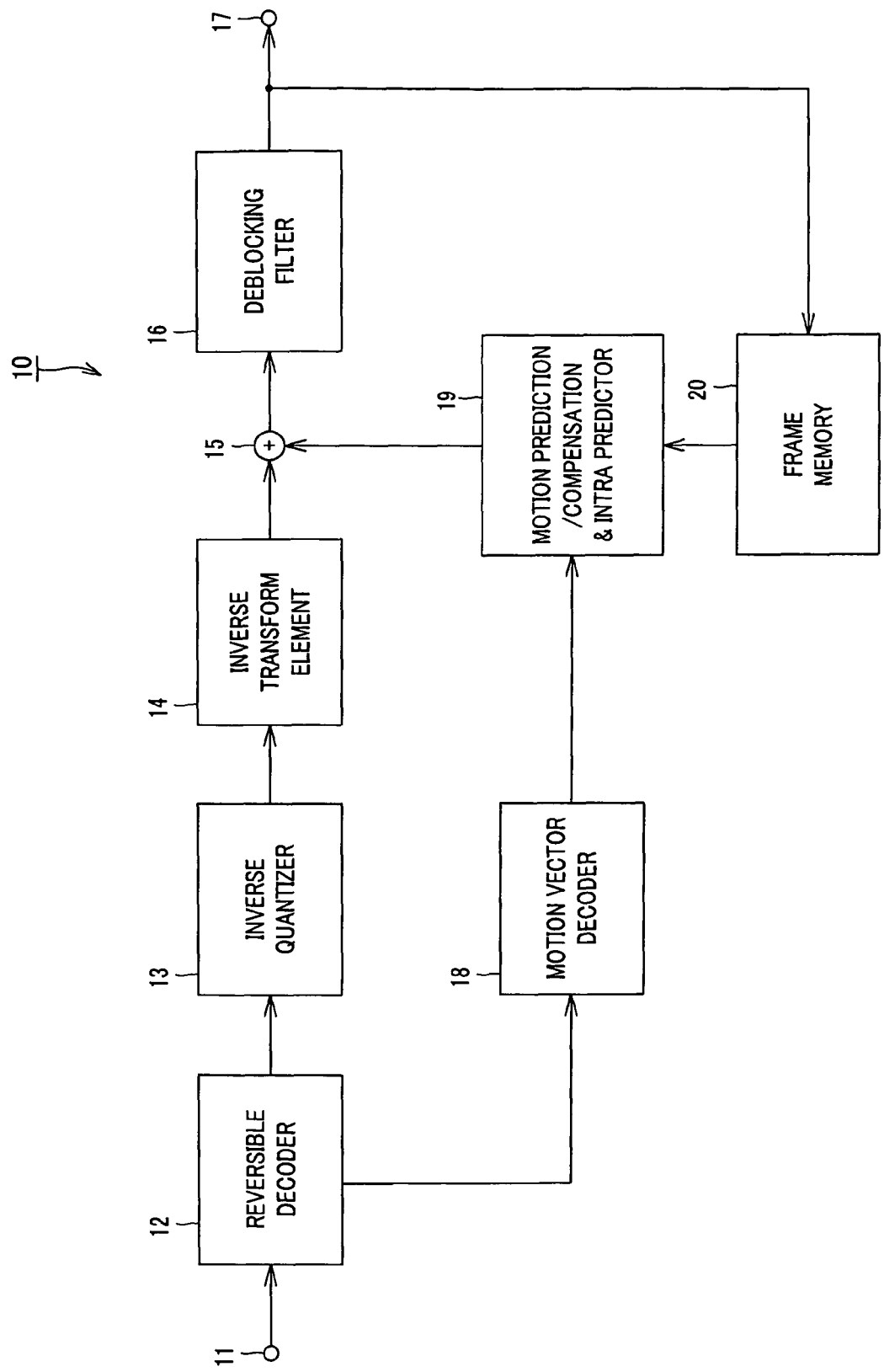
FIG. 3 is a block diagram showing an image decoding apparatus according to the present invention.

Initially, the first embodiment will be explained. An image decoding apparatus 10 according to the first embodiment has a configuration as shown in FIG. 3. The image decoding apparatus 10 comprises a reversible decoder 12 supplied, from an input terminal 11, image compressed signal (bit stream) temporarily stored in storage buffer (not shown) to decode transform coefficients, an inverse-quantizer 13 indicating, as a flag, in inverse-quantizing transform coefficients which have been decoded by the reversible decoder 12, existence of each transform coefficient every processing block of inverse-quantization, and an inverse transform element 14 for changing inverse transform processing to be implemented to inverse quantization transform coefficients within the processing block by using the flag which has been indicated by the inverse quantizer 13.

Moreover, the image decoding apparatus 10 comprises an adder 15 for adding an output of the inverse transform element 14 and an output of a motion prediction/compensation element intra predictor 19 which will be described later, and a deblocking filter 16 for implementing deblocking processing to an added output of the adder 15 to deliver correction output in which distortion of block has been corrected to an output terminal 17 and a frame memory 20 which will be described later. Further, the image decoding apparatus 10 comprises a motion vector decoder 18 for decoding motion vector from decoded output by the reversible decoder 12, and a motion prediction/compensation element intra predictor 19 for generating intra prediction image on the basis of image from the frame memory 20 and for generating inter-prediction image on the basis of motion vector from the motion vector decoder 18 and image from the frame memory 20.

In FIG. 3, compressed image signal delivered from the storage buffer to the reversible decoder 12 through the input terminal 11 is a signal in which an input image signal is blocked at the image encoding apparatus to implement orthogonal transform thereto on the block basis so that quantization is performed with respect thereto. The reversible decoder 12 implements processing such as variable length decoding or arithmetic decoding, etc. to the image compressed information on the basis of the determined format for image compressed information to deliver quantized transform coefficients to the inverse-quantizer 13. Moreover, in the case where corresponding frame is inter-encoded frame, the reversible decoder 12 delivers image compressed information to the motion vector decoder 18. The motion vector decoder 18 serves to decode motion vector information stored in the header portion of the image compressed information to deliver the information thus decoded to the motion prediction/compensation element intra predictor 19.

The inverse-quantizer 13 inverse-quantizes quantized transform coefficients which have been delivered from the reversible decoder 12 to deliver the transform coefficients thus processed to the inverse transform element 14. The inverse transform element 14 implements inverse-orthogonal transform such as Inverse Discrete Cosine Transform, or Inverse Karhunen-Loeve Transform, etc. to the transform coefficients on the basis of the determined format for image compressed information.

Here, in the case where corresponding frame is intra-encoded frame, the motion prediction/compensation element intra predictor 19 reads out image from the frame memory 20 to generate prediction image in accordance with the intra prediction mode to which reversible decoding processing has been implemented at the reversible decoder 12. The adder 15 adds output of the inverse transform element 14 and the prediction image.

On the other hand, in the case where corresponding frame is inter-encoded frame, the motion prediction/compensation element intra predictor 19 generates reference image on the basis of motion vector information to which reversible decoding processing has been implemented and image information stored in the frame memory 20 to deliver the reference image thus generated to the adder 15. The adder 15 synthesizes the reference image and an output of the inverse orthogonal transform element 14.

Block distortion of either added output from the adder 15 is removed by the deblocking filter 16. Thereafter, the output thus processed is delivered from the output terminal 17 to the D/A converter, at which D/A converting processing is implemented. An output thus processed is provided.

Figure 4A:
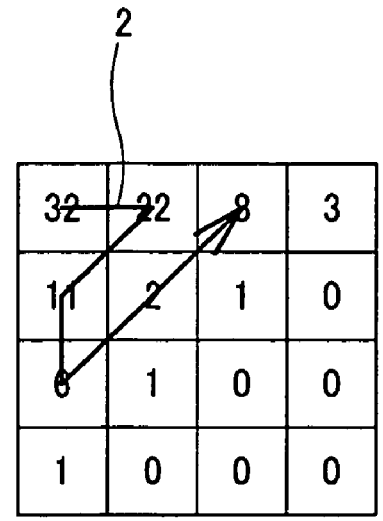
FIG. 4A is a view used for explanation of inverse quantization processing by zigzag scan by inverse quantizer.
Figure 4B:
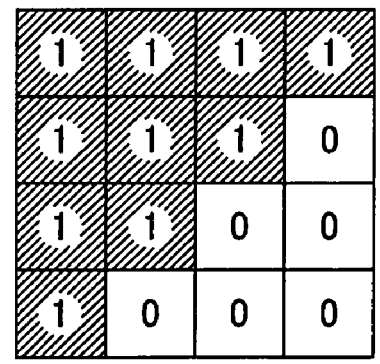
FIG. 4B is a view for explaining flag management of coefficients.

In inverse-quantizing transform coefficients which have been decoded by the reversible decoder 12, the inverse quantizer 13 indicates, as a flag, existence of each transform coefficient every processing block of inverse quantization. For example, at the AVC, the inverse quantizer 13 inverse-quantizes transform coefficients which have been decoded by the reversible decoder 12 while performing, every block 4×4 as shown in FIG. 4A, zigzag scan as indicated by arrow Z in the figure in inverse-quantizing transform coefficients which have been decoded by the reversible decoder 12. At this time, as shown in FIG. 4B, the inverse quantizer 13 performs, by a flag, management of coefficient generating (occurrence) position within 4×4 block as shown in FIG. 4B. Position of coefficients appearing at 4×4 block shown in FIG. 4A is indicated by using flag of 0, 1 as shown in FIG. 4B to hold the position of the coefficient which has been indicated.

Figures 5, 6:
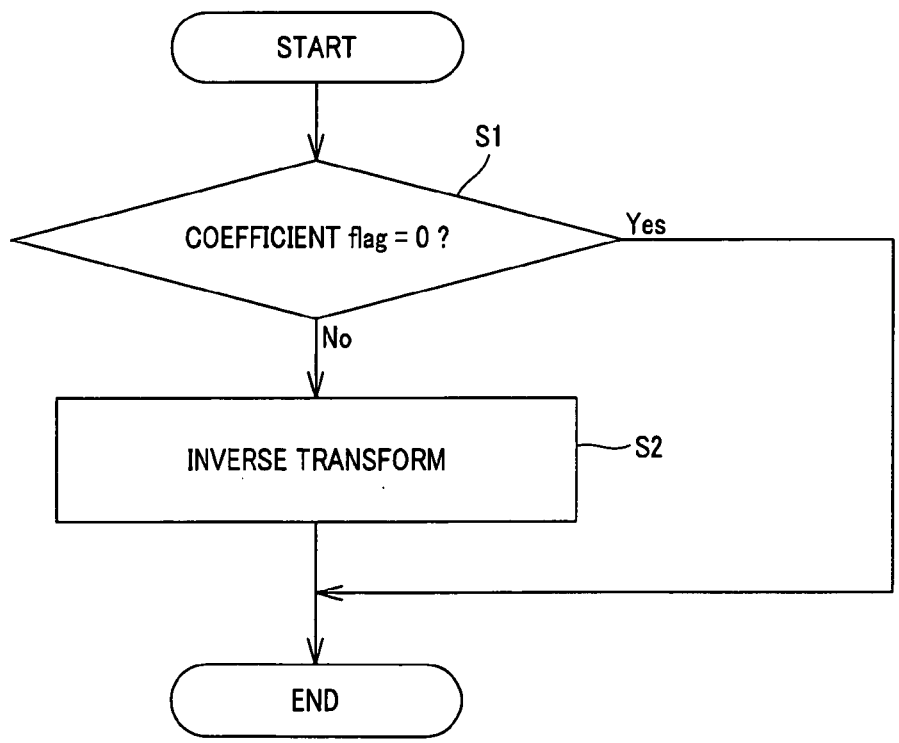
FIG. 5 is a view showing the formula of transform matrix of inverse transform processing at AVC.
FIG. 6 is a flowchart showing flow of inverse transform processing of inverse transform element.

As, e.g., inverse transform processing of AVC performed at the inverse transform element 14, there is employed special transform system in which Inverse Discrete Cosine Transform (IDCT) of 4×4 has been improved. The formula of the transform matrix is as shown in FIG. 5.

At the inverse transform element 14, inverse transform processing to be implemented to inverse quantization transform coefficients within processing block of 4×4 is changed on the basis of value of flag shown in FIG. 4B that the inverse quantizer 13 holds. As the processing procedure is shown in FIG. 6, the inverse transform element 14 is operative so that when it is judged in inverse-transform processing that coefficient flag is 0 (zero) (YES at step S1), it does not implement inverse transform processing, while when it is judged that coefficient flag is not 0 (zero) (NO at step S1), it implements inverse transform processing (step S2). Accordingly, such inverse transform processing is not performed with respect to block in which any coefficient does not exist as all indicated by 0 flag. Namely, inverse transform processing to be implemented to inverse quantization coefficients within the processing block is skipped.

Figure 7:
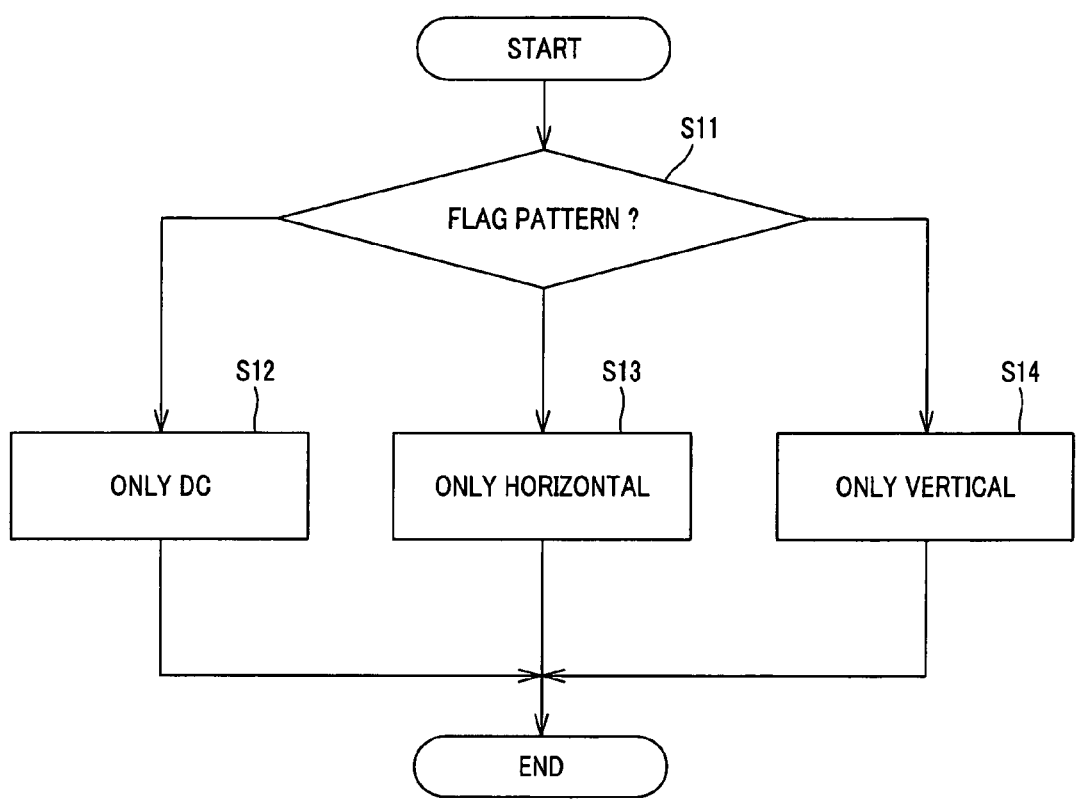
FIG. 7 is a flowchart showing flow of inverse transform processing of inverse transform element.

Moreover, at the inverse transform element 14, inverse transform processing is simplified depending upon occurrence place of the coefficients. The occurrence place of coefficients is judged by generation pattern of flag. For example, at the processing procedure shown in FIG. 7, flag pattern is checked at step S11. When it is judged that corresponding component of the flag pattern is DC component in which coefficient appears only at, e.g., left upper pixel within 4×4 block, inverse transform processing is changed at step S12. Moreover, at the step S11, flag pattern is checked. When it is judged that corresponding flag pattern is horizontal pattern in which coefficients exist only at pixels of the uppermost row within the block, inverse transform processing is changed at step S13. Moreover, the flag pattern is checked at the step S11. When corresponding flag pattern is vertical pattern in which coefficients exist only at pixels of column of the left end within the block, the inverse transform processing is changed at step S14.

When coefficient a appears only at DC component (left upper pixel of 4×4 block) and the remaining pixels all have flag 0, the inverse transform element 14 copies value a of the DC component into all pixel values as shown in FIG. 8A at step S12 to allow the copied pixels thus obtained to be transformed coefficients. When corresponding flag pattern is horizontal pattern in which coefficients a, b, c, d exist at pixels of the uppermost row within the block and the remaining pixels all have flag 0, the inverse transform element 14 performs transform processing in a lateral direction as shown in FIG. 8B at step S13 to allow coefficients thus obtained to be a', b', c', d' thereafter to copy pixel values in a longitudinal direction to allow them to be transformed coefficients. Moreover, when corresponding flag pattern is vertical pattern in which coefficients a, b, c, d exist only at pixels of the column of the left end within the block and the remaining pixels all have flag 0, the inverse transform element 14 performs transform processing in a longitudinal direction as shown in FIG. 8C at step S14 to allow coefficients thus obtained to be a', b' c', d' thereafter to copy pixel values in a lateral direction to allow them to be transformed coefficients.

As stated above, the inverse transform element 14 is not required to perform matrix calculations in length and breadth directions at all blocks. Thus, high speed decoding processing can be realized at the image decoding apparatus 10.

Figure 2:
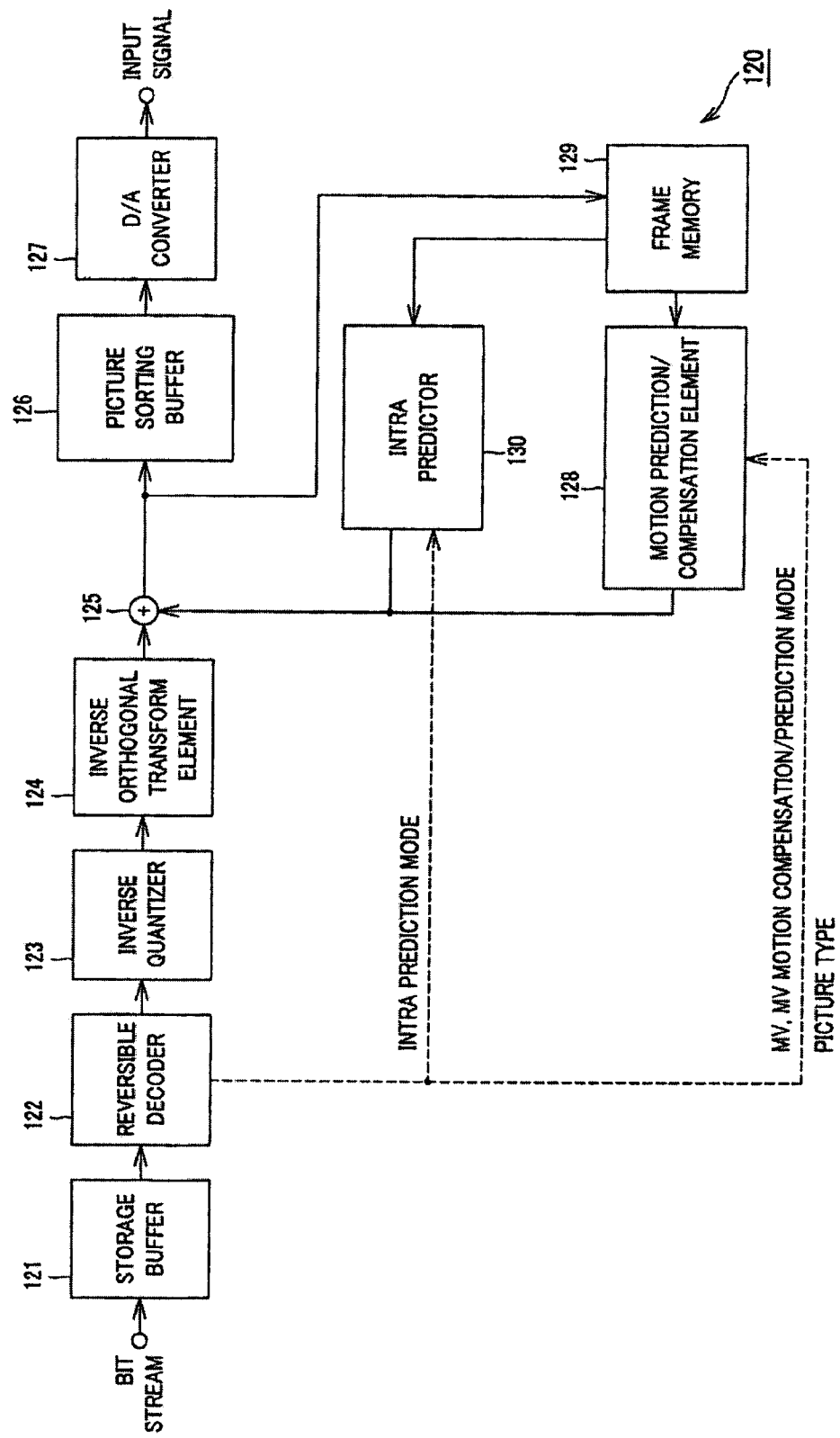
FIG. 2 is a block diagram showing an image decoding apparatus.

Then, the second embodiment of the present invention will be explained. The second embodiment is directed to an image decoding apparatus adapted for decoding compressed image signal encoded by the encoding system in which standardization is performed by JVT (hereinafter referred to as JVT Codec or H.264|MPEG-4 AVC). The configuration thereof is similar to that of the previously described image information decoding apparatus 120 shown in FIG. 2. It is to be noted that the image decoding apparatus of the second embodiment is adapted to indicate, as a flag, existence of each transform coefficient every processing block of inverse quantization in inverse-quantizing, at the inverse-quantizer 123 shown in FIG. 2, transform coefficients which have been decoded by the reversible decoder 122. The processing block consists of 4×4 pixels, 8×8 pixels or 16×16 pixels.

Moreover, the inverse orthogonal transform element 124 serves to change inverse transform processing to be implemented to inverse quantization transform coefficients within processing block of 4×4 on the basis of value of the above-described flag shown in FIG. 4B that the inverse quantizer 123 holds. The inverse orthogonal transform element 124 serves to change inverse transform processing by processing procedure which has been already explained with reference to FIGS. 6, 7 and 8A to 8C. The detail thereof will be omitted.

Accordingly, also in the second embodiment, it becomes unnecessary to perform matrix calculations in length and breadth directions at all blocks consisting of 4×4 pixels, 8×8 pixels or 16×16 pixels. Thus, at the image decoding apparatus, high speed decoding processing can be realized.

Figure 1:
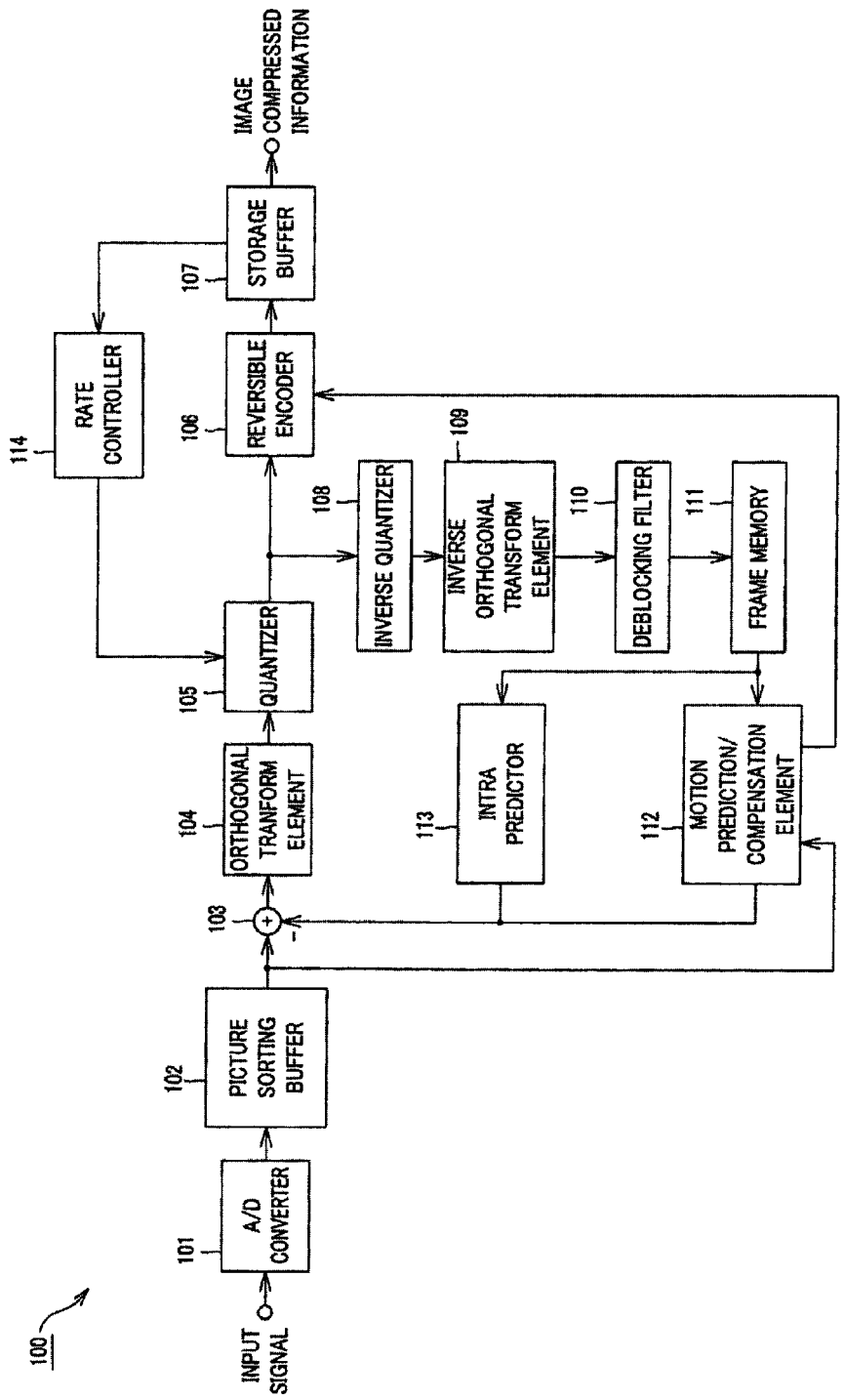
FIG. 1 is a block diagram showing a conventional image encoding apparatus.

Then, the third embodiment will be explained. The third embodiment is directed to a local decoder within the previously described image information encoding apparatus 100 as shown in FIG. 1. The local decoder is comprised of inverse quantizer 108, and inverse orthogonal transform element 109. In implementing, at inverse quantizer 123, inverse quantization processing to transform coefficients which have been quantized at the quantizer 105, existence of each transform coefficient is indicated as a flag every processing block of inverse quantization. The processing block consists of 4×4 pixels, 8×8 pixels or 16×16 pixels.

The inverse orthogonal transform element 109 serves to change inverse transform processing to be implemented to inverse quantization transform coefficients within processing block on the basis of value of flag shown in FIG. 4B that the inverse quantizer 108 holds. The inverse orthogonal transform element 109 serves to change inverse transform processing by processing procedure which has been already explained with reference to FIGS. 6, 7 and 8A to 8C. The detail thereof will be omitted.

Accordingly, also in the third embodiment, it becomes unnecessary to perform matrix calculations in length and breadth directions at all blocks consisting of 4×4 pixels, 8×8 pixels or 16×16 pixels. Thus, at the image decoding apparatus, high speed decoding processing can be realized.

It is to be noted that while the present invention has been described in accordance with certain preferred embodiments thereof illustrated in the accompanying drawings and described in detail, it should be understood by those ordinarily skilled in the art that the invention is not limited to embodiments, but various modifications, alternative construction or equivalents can be implemented without departing from the scope and spirit of the present invention as set forth by appended claims.

Industrial Applicability

The image decoding apparatus, the image decoding method and the image decoding program according to the present invention are used in receiving, through network media such as satellite broadcasting service, cable TV (television) or Internet, etc., or in processing, on storage or memory media such as optical disc, magnetic disc or flash memory, etc., image compressed information (bit stream) compressed by orthogonal transform such as Discrete Cosine Transform or Karhunee-Loeve Transform, etc. and motion prediction/compensation like MPEG (Moving Picture Experts Group), H.26x, etc.

The invention claimed is:

1. An image decoding apparatus adapted for decoding information obtained by implementing inverse quantization and inverse orthogonal transform to an image compressed information in which an input image signal is blocked to implement orthogonal transform on a block basis to quantize the input image signal, the image decoding apparatus comprising:

a decoding unit configured to decode quantized and encoded transform coefficients;

an inverse-quantizing unit configured to indicate, as a flag, existence of each transform coefficient in a processing block of the inverse-quantization; and an inverse transform unit configured to change, based on the flag, inverse transform processing to be implemented to inverse quantization transform coefficients within the processing block, wherein changing the inverse transform based on the flag comprises changing the inverse transform when a flag pattern indicates the existence of inverse transform coefficient coefficients only at a plurality of pixels of an uppermost row within the processing block.

2. The image decoding apparatus as set forth in claim 1, wherein the inverse transform unit simplifies inverse transform processing to be implemented to inverse quantization transform coefficients within the processing block by using the flag.

3. The image decoding apparatus as set forth in claim 1, wherein the inverse transform unit is configured, when it is determined from the flag that inverse quantization transform coefficients exist only in a horizontal direction within the processing block, to perform transform processing in a lateral direction thereafter to copy pixel values in a longitudinal direction to perform inverse transform processing.

4. The image decoding apparatus as set forth in claim 1, wherein the inverse transform unit is configured, when it is determined from the flag that inverse quantization transform coefficients exist only in a vertical direction within the processing block, to perform transform processing in a lateral direction thereafter to copy pixel values in a latitudinal direction to perform inverse transform processing.

5. An image decoding method of decoding apparatus adapted for decoding information obtained by implementing inverse quantization and inverse orthogonal transform to an image compressed information in which an input image signal is blocked to implement orthogonal transform on a block basis to quantize the input image signal, the image decoding method comprising:

decoding quantized and encoded transform coefficients;
  indicating, as a flag, the existence of each transform coefficient in a processing block of the inverse-quantization; and
  changing, based on the flag, inverse transform processing to be implemented to inverse quantization transform coefficients within the processing block by using the flag, wherein changing the inverse transform based on the flag comprises changing the inverse transform when a flag pattern indicates the existence of inverse transform coefficient coefficients only at a plurality of pixels of an uppermost row within the processing block.

6. The image decoding method as set forth in claim 5, wherein the inverse transform simplifies inverse transform processing to be implemented to inverse quantization transform coefficients within the processing block by using the flag.

7. The image decoding method as set forth in claim 5, wherein the inverse transform copies, when it is determined from the flag that inverse quantization transform coefficients only include a DC component, value of the DC component into the remaining all pixel values within the processing block.

8. The image decoding method as set forth in claim 5, wherein the inverse transform performs, when it is determined from the flag that inverse quantization transform coefficients exist only in a horizontal direction within the processing block, transform processing in a lateral direction thereafter to copy pixel values in a longitudinal direction to perform inverse transform processing.

9. The image decoding method as set forth in claim 5, wherein the inverse transform preferences, when it is determined from the flag that inverse quantization transform coefficients exist only in a vertical direction within the processing block, transform processing in a longitudinal direction thereafter to copy pixel values in a lateral direction to perform inverse transform processing.

10. A non-transitory computer readable storage medium including a set of instructions for executing an image decoding method of decoding information obtained by implementing inverse quantization and inverse orthogonal transform to an image compressed information in which an input image signal is blocked to implement orthogonal transform on a block basis to quantize the input image signal, the image decoding method comprising:

decoding quantized and encoded transform coefficients;
  indicating, as a flag, the existence of each transform coefficient in a processing block of the inverse-quantization; and
  changing, based on the flag, inverse transform processing to be implemented to inverse quantization transform coefficients within the processing block by using the flag, wherein changing the inverse transform based on the flag comprises changing the inverse transform when a flag pattern indicates the existence of inverse transform coefficient coefficients only at a plurality of pixels of an uppermost row within the processing block.

* * * * *